(12) United States Patent
Zheng et al.

(10) Patent No.: US 9,718,552 B2
(45) Date of Patent: Aug. 1, 2017

(54) PASSENGER SEAT FRAME

(71) Applicants: SINGAPORE TECHNOLOGIES AEROSPACE LTD, Paya Lebar (SG); TENRYU AERO COMPONENT CO., LTD., Kakamigahara, Gifu (JP)

(72) Inventors: Guo Ying Zheng, Paya Lebar (SG); Charles Fakhri Baz, Paya Lebar (SG); Teruo Sawada, Kakamigahara (JP)

(73) Assignees: Singapore Technologies Aerospace Ltd., Paya Lebar (SG); Tenryu Aero Component Co., Ltd., Kakamigahara-shi, Gifu (JP)

( * ) Notice: Subject to any disclaimer, the term of this patent is extended or adjusted under 35 U.S.C. 154(b) by 76 days.

(21) Appl. No.: 14/782,270

(22) PCT Filed: Apr. 5, 2013

(86) PCT No.: PCT/SG2013/000137
§ 371 (c)(1),
(2) Date: Oct. 2, 2015

(87) PCT Pub. No.: WO2014/163580
PCT Pub. Date: Oct. 9, 2014

(65) Prior Publication Data
US 2016/0023769 A1    Jan. 28, 2016

(51) Int. Cl.
*A47C 7/02* (2006.01)
*B64D 11/06* (2006.01)

(52) U.S. Cl.
CPC ...... *B64D 11/0648* (2014.12); *B64D 11/0619* (2014.12); *B64D 11/0696* (2013.01); *B64D 11/06* (2013.01); *B64D 11/0649* (2014.12)

(58) Field of Classification Search
CPC ............ B64D 11/0648; B64D 11/0649; B64D 11/0696; B64D 11/06; B64D 11/0619
(Continued)

(56) References Cited

U.S. PATENT DOCUMENTS 2,933,127 A * 4/1960 Brewster ................ B64D 11/06
244/122 R
3,037,812 A * 6/1962 Monroe ................ B64D 11/06
297/216.14
(Continued)

FOREIGN PATENT DOCUMENTS

DE   10 2005 022 694 A1   11/2006
FR       2 684 955 A1        6/1993
(Continued)

OTHER PUBLICATIONS

International Search Report for corresponding International Application No. PCT/SG2013/000137, mailed Nov. 8, 2013, 3pp.
(Continued)

*Primary Examiner* — Chi Q Nguyen
(74) *Attorney, Agent, or Firm* — Lewis Roca Rothgerber Christie LLP

(57) ABSTRACT

A seat leg assembly for a passenger seat includes a brace member to extend from a front end of a base frame of the passenger seat to a rear floor fitting; a front leg to extend from a front floor fitting to the brace member and connected to the brace member; a rear leg portion extending from a rear end of the base frame to the brace member; and a first joint structure connecting the rear leg portion to the brace member.

20 Claims, 3 Drawing Sheets

(58) Field of Classification Search
USPC ..... 297/452.18, 452.1, 216.1, 216.2, 452.55, 297/452.65, 452.15, 423.1, 452.39; 248/188.9, 188.91, 503.1
See application file for complete search history.

(56) References Cited

U.S. PATENT DOCUMENTS

| | | | |
|---|---|---|---|
| 4,526,421 A * | 7/1985 | Brennan | B64D 11/06 108/51.3 |
| 5,069,505 A | 12/1991 | Amthor et al. | |
| 5,344,210 A | 9/1994 | Marwan et al. | |
| 5,522,640 A | 6/1996 | Bilezikjian | |
| 5,553,923 A * | 9/1996 | Bilezikjian | B64D 11/06 297/232 |
| 5,575,532 A * | 11/1996 | von Rolbicki | B64D 11/0693 297/232 |
| 5,657,950 A | 8/1997 | Han et al. | |
| 5,743,592 A | 4/1998 | Bedouch | |
| 6,644,738 B2 * | 11/2003 | Williamson | B60N 2/682 244/122 R |
| 6,669,295 B2 * | 12/2003 | Williamson | B60N 2/015 297/301.2 |
| 6,672,661 B2 * | 1/2004 | Williamson | B60N 2/015 297/232 |
| 6,749,266 B2 * | 6/2004 | Williamson | B64D 11/06 297/248 |
| 6,799,805 B2 * | 10/2004 | Johnson | B64D 11/0015 244/122 R |
| 7,029,215 B2 * | 4/2006 | Dowty | B64D 11/0696 410/102 |
| 7,182,292 B2 * | 2/2007 | Howard | B64D 11/0624 244/118.6 |
| D606,344 S | 12/2009 | Aruga et al. | |
| 7,857,259 B2 * | 12/2010 | Baatz | B64C 1/20 244/118.6 |
| 8,047,613 B1 * | 11/2011 | Ahad | B64D 11/06 297/163 |
| 8,544,796 B2 * | 10/2013 | Pozzi | B64C 1/18 244/118.6 |
| 2003/0085601 A1 | 5/2003 | Hudswell et al. | |
| 2003/0094838 A1 * | 5/2003 | Williamson | B60N 2/682 297/232 |
| 2004/0100138 A1 * | 5/2004 | Johnson | B64D 11/0015 297/452.18 |
| 2005/0269844 A1 | 12/2005 | Abt | |
| 2008/0282523 A1 * | 11/2008 | Kismarton | B64D 11/06 29/91.1 |
| 2008/0290242 A1 | 11/2008 | Kismarton et al. | |
| 2009/0121523 A1 * | 5/2009 | Johnson | B60N 3/004 297/140 |
| 2010/0102170 A1 * | 4/2010 | LaConte | B64D 11/06 244/122 R |
| 2010/0289318 A1 * | 11/2010 | Le | B60N 2/68 297/452.2 |
| 2012/0098322 A1 * | 4/2012 | Muller | B64D 11/06 297/452.18 |
| 2017/0021933 A1 * | 1/2017 | Pozzi | B64D 11/0636 |

FOREIGN PATENT DOCUMENTS

| | | |
|---|---|---|
| JP | 1-145246 A | 6/1989 |
| JP | 4-314694 A | 11/1992 |

OTHER PUBLICATIONS

International Preliminary Report on Patentability for corresponding International Application No. PCT/SG2013/000137, completed Jul. 28, 2015, 6pp.

Office action mailed Nov. 15, 2016 in corresponding JP Patent Application No. 2016506292, including English translation 6pp.

Office action dated Jul. 5, 2016 for corresponding Chinese Patent Application No. 201380077208.7 including English translation, 10pp.

Office action mailed Mar. 21, 2017 in corresponding CN Patent Application No. 201380077208.7 (3pp.), including English translation (4pp.).

* cited by examiner

PASSENGER SEAT FRAME

CROSS-REFERENCE TO RELATED APPLICATIONS

This application is a national phase application under 35 U.S.C. §371 of International Application No. PCT/SG2013/000137, filed on Apr. 5, 2013, the disclosure of which is incorporated herein by reference in its entirety.

FIELD OF INVENTION

The present invention relates broadly to a seat leg assembly for a passenger seat, to a frame for a passenger seat and to a passenger seat. More particularly, embodiments of the present invention relate to the design of a seat leg assembly with improved load distribution and energy absorption capabilities.

BACKGROUND

A standard economy-class-type passenger seat for an aircraft comprises of a seat bottom, a reclining seat back and armrests, all supported by structural frames mounted on a laterally spaced-apart leg assembly. The leg assembly has, amongst others, two important roles in the structural make-up of a passenger seat, which may be summarized as:
1. To keep the seats in position along the floor.
2. To be crashworthy to absorb energy during the unlikely event of an impact.

The survivability of passengers during crash of an aircraft will depend on direct loading on the human body, such as lumbar load, degree of impact on the head, which is commonly measured as a Head Injury Criterion (HIC), which affects consciousness of the passenger, and passageway that allows for passenger egression. For example, in a crash or collision scenario, a 14 g downward load and/or a 16 g forward load may be experienced.

One of the most common causes of injuries experienced in an aircraft collision/crash is by excessive initial loads caused by deceleration, for which loads the materials of the aircraft's underlying support structures and their ability to dissipate energy are the main factors. A leg assembly that is too stiff may be able to prevent the seat from collapsing on itself during a crash, keeping the occupants safe from being crushed. However, that stiffness in turn may cause damage to the vital internal organs and spinal column of the passenger, as little energy is attenuated or absorbed during the incident. Conversely, if the leg assembly is too flexible, it would overly deform and fail in a crash.

In a conventional design, the seat leg assembly typically consists of a front leg, a rear leg and a connecting member between the front and rear legs. The front and rear legs are standing on the floor, while the connecting member is off the floor. In one proposed design, the front leg, rear leg and connecting member are designed as an integral member as shown in U.S. Pat. No. 5,522,640.

A need therefore exists to provide a leg assembly for a passenger seat which can provide at least an alternative to existing leg assembly designs, and preferably with improved load distribution and energy absorption capabilities.

SUMMARY

In accordance with a first aspect of the present invention, there is provided a seat leg assembly for a passenger seat, the assembly comprising a brace member configured to extend from a front end of a base frame of the passenger seat to a rear floor fitting; a front leg configured to extend from a front floor fitting to the brace member and connected to the brace member; a rear leg portion extending from a rear end of the base frame to the brace member; and a first joint structure connecting the rear leg portion to the brace member.

In accordance with a second aspect of the present invention, there is provided a frame for a passenger seat comprising the seat leg assembly of the first aspect.

In accordance with a third aspect of the present invention, there is provided a passenger seat comprising the seat leg assembly of the first aspect.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Embodiments of the present invention provide a leg assembly for a passenger seat that can offer improved flexibility which translates to better energy dissipation amongst its structural components.

Figure 1:
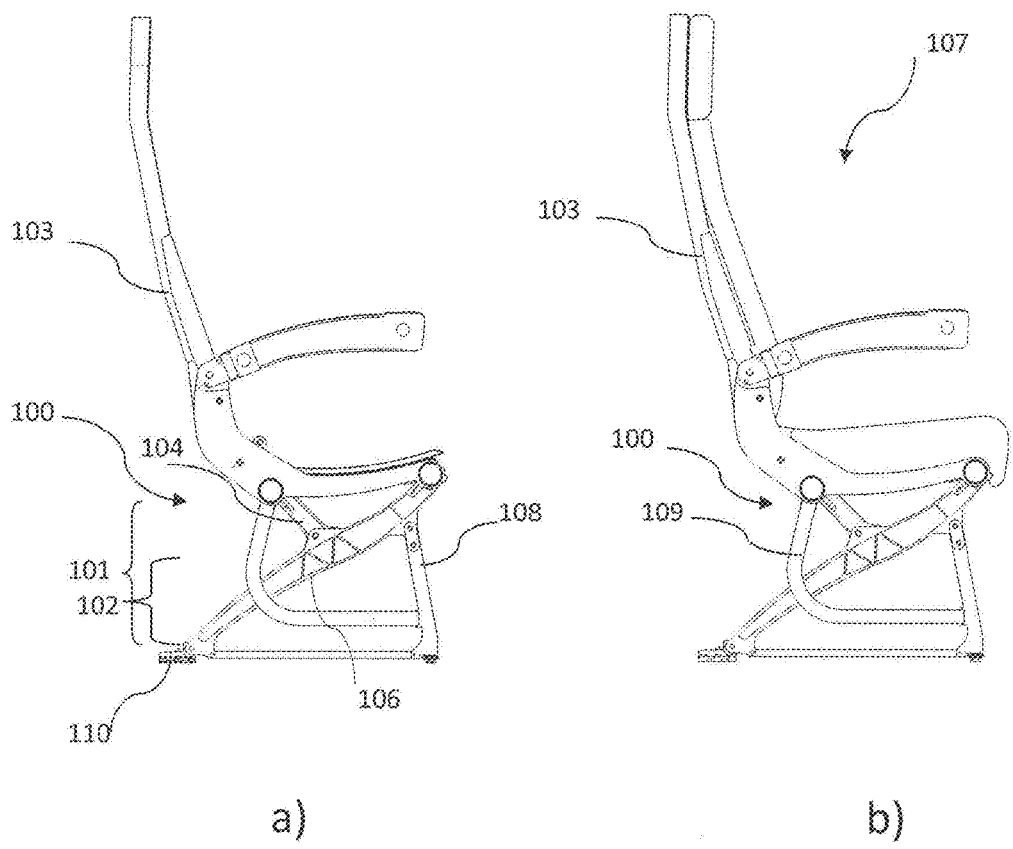
FIG. 1a) shows a schematic side view drawing of frame for a passenger seat according to an example embodiment.
FIG. 1b) shows a schematic side view drawing of a passenger seat according to an example embodiment.

FIG. 1a) shows one embodiment of a leg assembly 100, incorporated in an embodiment of a frame 103 for a passenger seat, in which each rear leg 101 is "split" into two parts, a lower part 102 and an upper part 104. A brace 106 is designed such that the lower part 102 of the rear leg 101 is "combined", i.e. integral with, the brace 106. The brace 106 is running from the top of front leg 108 diagonally down to the floor, i.e. to a rear mounting point 110 on the floor. The upper part 104 of the rear leg 101 is off the floor, and a joint 112 is formed between the upper part 104 of the rear leg 101 and the brace 106, which in turn is in direct connection to the rear mounting point 110 on the floor.

The example embodiment can advantageously allow better load distribution compared to a conventional leg assembly design, by relieving high load at the flexible joint between the upper part 104 of the rear leg 101 and the brace 106. Preferably, the improved load and energy distribution can result in the efficiency of the leg assembly being improved. In otherwords, with the same material used, survivability of the passenger can advantageously be improved.

FIG. 1b) shows the leg assembly 100 as part of the frame 103 and incorporated in a passenger seat 107 according to an example embodiment. In this example, a guard 109 is attached to the leg assembly, for example facing the aisle in a passenger aircraft. The guard 109 does not contribute significantly to the structural characteristics of the leg assembly, in this example embodiment.

Figure 2:
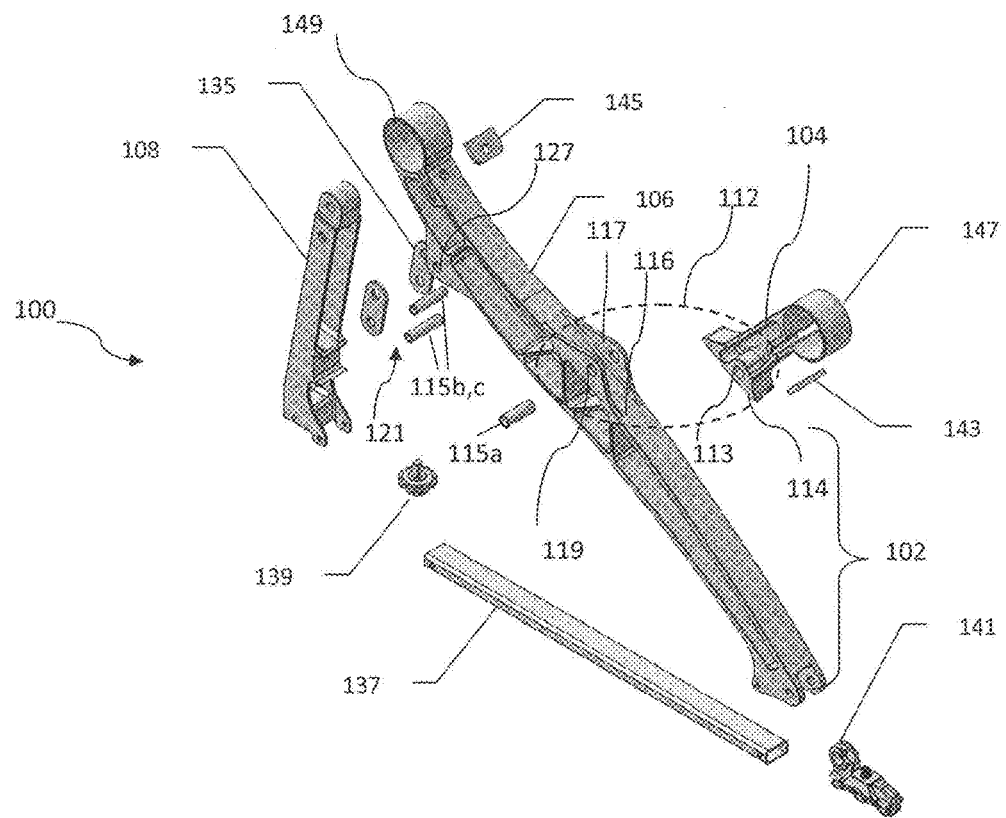
FIG. 2 shows a schematic exploded view of a seat leg assembly according to an example embodiment.

With reference to FIG. 2, in the example embodiment, the separation or splitting of the rear leg 101 (FIG. 1) into the upper part 104 and the lower part 102, a new load path comprising the off floor upper part 104 and the down-to-floor lower part 102, which is integral with the brace 106. Preferably, the joint 112 between the upper part 104 and the brace 106 is designed such that rotation resistance is built-in with a single bolting pivot. In one embodiment, the rotation resistance is achieved by designing mating segmented flat surfaces 114, 116 on the upper part 104 and on the brace 106 respectively. Those surfaces 114, 116 are preferably capable of resisting compressive loading through contact to form a coupling, when tensile loading is applied at the bolting pivot. As shown in this embodiment, the pivot comprises a first axle member in the form of a bush 115a received in corresponding holes in lug flanges 117, 119 on the brace 106 and in the upper part 104.

Advantageously, the joint 112 design in example embodiments is capable of releasing certain loads, especially moments, while being capable of asserting desired counter force and moments, to preferably ensure the integrity of the leg assembly 100. The location of the connecting joint 112 between the upper part 104 and the brace 106 can be varied in different embodiments, as well as the upper part 104 and brace 106 design, to preferably achieve an optimum load distribution in the entire leg assembly.

The front leg 108 is connected via a further joint 121 to the brace 106. In this embodiment, the joint 121 comprises a second axle member in the form of a bush 115b received in a corresponding upper hole at the top of the front leg 108, and corresponding holes in lug flanges e.g. 127 on the brace 106. A second bush 115c is received in corresponding lower holes at the top of the front lea 108, and retainer plates e.g. 135. A spreader 137 extends between the bottom ends of the front leg 108 and the brace 106 respectively, and between a seat track fitting 139 and a triple stud fitting 141, which are used mounting the bottom ends of the front leg 108 and the brace 106 respectively to the floor, i.e. to keep the seat in position along the floor. Spacers 143, 145 are provided for bolt-fitting the mounting loops 147, 149 to the base frame 408 (FIG. 4).

Figure 3:
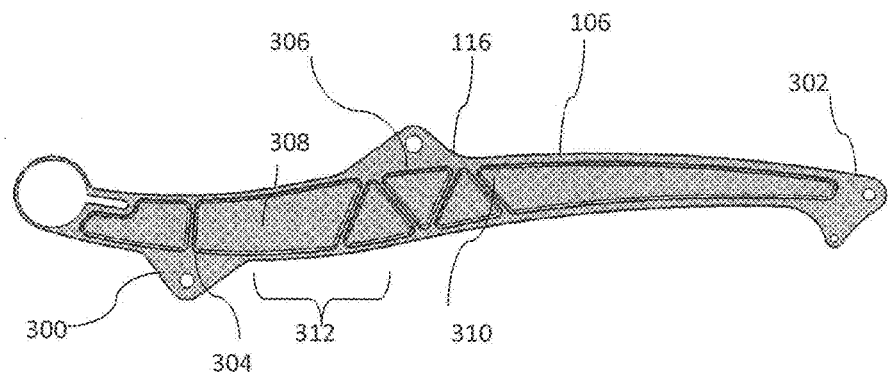
FIG. 3 shows a schematic side view of a brace of the leg assembly of FIG. 3.

With reference to FIG. 3, the brace 106 in this example embodiment is shaped to provide the desired mating surface 116 to the surface 114 on the upper part 104 (FIG. 2), and to provide for connecting interfaces 300, 302 to the front leg 108 and to the rear floor fitting 141 (FIG. 2). The shape and section design of the brace 106 preferably also takes into consideration the effective load transfer, an optimum utilization of material, and space provision for passengers. For example, the locations of the mating surface 116 and the connecting interface 300 are preferably placed substantially at or near respective peaks 304, 306 of two curved portions 308, 310 respectively of the brace 106, making those locations stiff, thus advantageously allowing the section 312 between the peaks 304, 306 to absorb energy by deformation. Furthermore, the brace 106 can preferably be designed so as to reduce the amount of raw material wasted when a machining process is used to fabricate the part.

Figure 4:
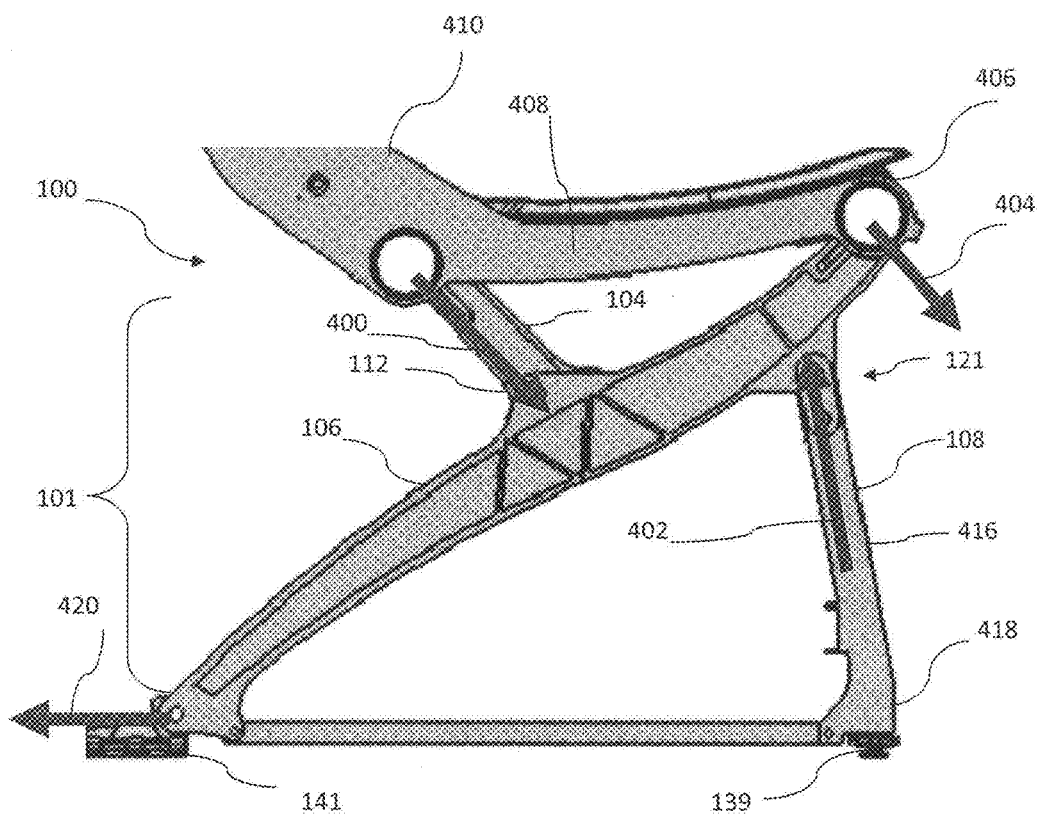
FIG. 4 shows a schematic side view of part of the frame structure of FIG. 1 illustrating loads during impact or hard landing.

With reference to FIG. 4, the flat end surface (hidden) of the upper part 104 of the rear leg 101 is positioned along the top of the brace 106 and abutting the flat mating surface (hidden) on the brace 106, such as to limit movement of the upper part 104 of the rear leg 101 in this example embodiment. More particularly, the upper part 104 of the rear leg 101 is advantageously prevented from pivoting too far clockwise or anti-clockwise.

During impact or a hard landing, the joint 112 advantageously allows the upper part 104 of the rear leg 101 to transfer the load 400 to the brace 106. The front leg 108 advantageously provides a reaction or counter force 402 causing the brace 106 to flex in the region between the upper part 104 of the rear leg 101 and the front leg 108. In the example embodiment, this flexing is made possible by the upper part 104 of the rear leg 101 not being integral with the brace 106, i.e. there can be flexing preferably without potential failure at the connection between the upper part 104 of the rear leg 101 and the brace 106, if they were e.g. instead integrally formed. The load 404 at the front 406 of the base frame 408 will typically be lower than the load 400, and is applied at a shorter distance from the joint 121 in this embodiment.

In this embodiment, the brace 106 is configured to extend from the front end 406 of the base frame 408 of the passenger seat 410 to the rear floor fitting 141, and the front leg 108 is configured to extend from the front floor fitting 139 to the brace 106 and connected to the brace 106. The front leg 108 of the leg assembly 100 in this embodiment is designed with a straight slant 416, followed by a straight vertical face 418, and is positioned to support the front end of the brace 106. The front leg 108 is advantageously responsible for providing the counter force 402 from the ground up to the brace 106, and to absorb some of the energy during an emergency situation. Also indicated in FIG. 4 is partial diversion of the load 400 onto the rear floor fitting 141, at numeral 420.

In one embodiment, a seat leg assembly for a passenger seat is provided, the assembly comprising a brace member configured to extend from a front end of a base frame of the passenger seat to a rear floor fitting; a front leg configured to extend from a front floor fitting to the brace member and connected to the brace member; a rear leg portion extending from a rear end of the base frame to the brace member; and a first joint structure connecting the rear leg portion to the brace member. The first joint structure can comprise a first axle member for providing a first pivot point for the rear leg portion relative to the brace member. The first joint structure can further comprise a pair of side blocks mounted on the brace member for supporting the axle member.

In one embodiment, the joint structure can comprise mating surfaces on the rear leg portion and the brace member respectively, for at least partially diverting a tensile loading of the rear leg portion at the first pivot point through the brace element. The mating surfaces can be substantially flat surfaces. The mating surfaces can extend on both sides of a projected location of the axle member onto the brace member.

In one embodiment, the front leg can be connected to the brace member at a position between the front end of the base frame and the first joint structure. The front leg can be connected to the brace member by a second joint structure. The second joint structure can comprise a second axle member for providing a second pivot point or the front leg relative to the brace member. The front leg can be configured for providing a counterforce to the brace element as a result of a downward force being applied to the base frame, such that the counterforce facilitates flexing of the brace element in a region between the first and second joint structures.

In one embodiment, the brace member can comprise forward and backward curved portions extending from an intermediate portion to which the first joint structure is connected. The brace member can be configured such that the forward curved portion is curved upward towards the front end of the base frame, and the backward curved portion is curved downward towards the back floor fitting.

In one embodiment, the assembly can comprise respective pairs of the brace member, the front leg and the rear leg portion. The brace members, front legs and rear leg portions of the respective pairs can be configured for connecting to the base frame at opposing sides thereof.

In one embodiment, the assembly can further comprise one or more spreader elements configured to extend between, and to be connected to, respective bottom ends of the brace member and the front leg. Each spreader element can be configured to extend substantially parallel to a floor surface between the front and rear floor fittings.

In one embodiment, the brace member can be configured to be connected to a triple stud fitting as the rear floor fitting.

In one embodiment, the front leg can be configured to be connected to a seat track fitting as the front floor fitting.

In one embodiment, the front leg can be configured with a substantially vertical face for connection to the floor fitting, and a straight portion extending in a slanted manner between the vertical face and the brace member. The front leg can be configured such that the straight portion extends in a backward slanting manner towards the brace member.

In the embodiments described, example materials for the various components include, but are not limited to one or more of Aluminum, steel, composites and polymers.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A seat leg assembly for a passenger seat, the assembly comprising:
    a brace member configured to extend from a front end of a base frame of the passenger seat to a rear floor fitting;
    a front leg configured to extend from a front floor fitting to the brace member and connected to the brace member with a slanted angle;
    a rear leg portion extending from a rear end of the base frame to the brace member; and
    a first joint structure connecting the rear leg portion to the brace member;
wherein the first joint structure comprises a first axle member for providing a first pivot point for the rear leg portion relative to the brace member and further comprises mating surfaces on the rear leg portion and the brace member respectively, to form a variable rotation resist joint when rotation motion between the rear leg and the brace member reaches a desired extent and to divert a tensile loading of the rear leg portion at the first pivot point through the brace member.

2. The assembly as claimed in claim 1, wherein the mating surfaces are substantially flat surfaces to achieve a desired load release, and to develop rotation resistance that is increasing during flexing between the rear leg portion and the brace member.

3. The assembly as claimed in claim 1, wherein the mating surfaces extend on both sides of a projected location of the first axle member onto the brace member.

4. The assembly as claimed in claim 1, wherein the first joint structure further comprises a pair of side blocks mounted on the brace member for supporting the first axle member for the rear leg portion.

5. The assembly as claimed in claim 1, wherein the front leg is connected to the brace member at a position between the front end of the base frame and the first joint structure.

6. The assembly as claimed in claim 5, wherein the front leg is connected to the brace member by a second joint structure.

7. The assembly as claimed in claim 6, wherein the second joint structure comprises a second axle member for providing a second pivot point for the front leg relative to the brace member.

8. The assembly as claimed in claim 5, wherein the front leg is configured for providing a counterforce to the brace member as a result of a downward force being applied to the base frame, such that the counterforce facilitates flexing of the brace member in a region between the first and second joint structures.

9. The assembly as claimed in claim 1, wherein the brace member comprises forward and backward curved portions extending from an intermediate portion to which the first joint structure is connected.

10. The assembly as claimed in claim 9, wherein the brace member is configured such that the forward curved portion is curved upward towards the front end of the base frame, and the backward curved portion is curved downward towards the back floor fitting.

11. The assembly as claimed in claim 1, comprising respective pairs of the brace member, the front leg and the rear leg portion.

12. The assembly as claimed in claim 11, wherein the brace members, front legs and rear leg portions of the respective pairs are configured for connecting to the base frame at opposing sides thereof.

13. The assembly as claimed in claim 1, further comprising one or more spreader elements configured to extend between, and to be connected to, respective bottom ends of the brace member and the front leg.

14. The assembly as claimed in claim 13, wherein each spreader element is configured to extend substantially parallel to a floor surface between the front and rear floor fittings.

15. The assembly as claimed in claim 1, wherein the brace member is configured to be connected to a triple stud fitting as the rear floor fitting.

16. The assembly as claimed in claim 1, wherein the front leg is configured to be connected to a seat track fitting as the front floor fitting.

17. The assembly as claimed in claim 1, wherein the front leg is configured with a substantially vertical face for connection to the floor fitting, and a straight portion extending in a slanted manner between the vertical face and the brace member.

18. The assembly as claimed in claim 17, wherein the front leg is configured such that the straight portion extends in a backward slanting manner towards the brace member.

19. A frame for a passenger seat, the frame comprising a seat leg assembly as claimed in claim 1.

20. A passenger seat comprising a seat leg assembly as claimed in claim 1.

* * * * *